United States Patent [19]

Konomi

[11] 3,927,563
[45] Dec. 23, 1975

[54] FLOW RATE MEASURING SYSTEM WITH CALIBRATION MEANS

[75] Inventor: Toshiaki Konomi, Susono, Japan

[73] Assignee: Toyota Jidosha Kogyo Kabushiki Kaisha, Japan

[22] Filed: May 29, 1974

[21] Appl. No.: 474,188

[30] Foreign Application Priority Data
June 6, 1973 Japan.................. 48-62880

[52] U.S. Cl............................................. 73/205 D
[51] Int. Cl.²........................................ G01F 1/00
[58] Field of Search......... 73/205 R, 205 D, 194 M, 73/3

[56] References Cited
UNITED STATES PATENTS

| | | | |
|---|---|---|---|
| 3,232,104 | 2/1966 | Fishman et al. | 73/205 D |
| 3,232,105 | 2/1966 | Fishman et al. | 73/205 D |
| 3,662,599 | 5/1972 | Masnik | 73/205 D |

OTHER PUBLICATIONS

Flo-From, Inc. "True Mass Flowmeter," received Dec. 16, 1964.

Primary Examiner—James J. Gill
Assistant Examiner—Anthony V. Ciarlante
Attorney, Agent, or Firm—Toren, McGeady and Stanger

[57] ABSTRACT

Calibration means are provided for a flow rate measuring system which includes a bridge circuit having four interconnected flow orifices and a first and a second pair of diagonally opposed flow points intermediate said orifices. The first pair of points are connected as input and output to said bridge circuit within a flow passage containing the fluid flow whose rate is to be measured. A constant capacity pump is connected across the second pair of points and a pressure converter adapted to be connected across said second pair of points is also provided. Calibration is effected by shutting fluid flow to and from said first pair of points while maintaining said constant capacity pump in operation and connecting the pressure converter across the second pair of points. The pressure converter which generates an output signal representative of the fluid flow to be measured may thus be calibrated by adjusting the output signal to represent one-half the flow rate through the constant capacity pump.

4 Claims, 2 Drawing Figures

FLOW RATE MEASURING SYSTEM WITH CALIBRATION MEANS

BACKGROUND OF THE INVENTION

The present invention relates to systems for measuring fluid flow rates such as, for example, might be used to measure the fuel consumption of an internal combustion engine, and more particularly to a system including calibration means.

Heretofore, in bench tests of internal combustion engines, a burette has been widely used as the most precise fuel consumption measuring device. More recently however a fluid flow meter utilizing fluid orifices and other means for measuring flow rate has been developed. However, inasmuch as this type of flow meter involves elements such as a pressure converter, a constant capacity pump, fluid orifices and the like, and since the capacity of these elements will vary with time as a result of temperature and/or other factors, there arises a necessity for periodic correction or calibration of such systems in order that they will provide an accurate indication of measured values while in use.

In the calibration of such fluid flow meters, methods have been employed which involve passage of a steady rate of flow through the meter, accumulation of fluid in a container and weighing of the fluid accumulated therein. However, such methods involve problems with regard to obtaining a steady flow rate and treatment of residual fuel remaining in the fluid passages. It has thus been found troublesome and rather difficult to perform calibration with a high degree of precision.

Flow meters of the aforementioned type have been found to comprise certain characteristics which are deemed significant from the point of view of accurate calibration. This type of flow meter usually comprises a bridge circuit including fluid orifices and a constant capacity pump, together with a pressure converter which operates to convert pressure differences between diagonally opposed points of the bridge circuit into an electrical signal. The pressure converter consists of an electrical circuit including resistances, semiconductor devices and other parts which are susceptible to temperature effects and other factors which cause deterioration and wear. Thus, the pressure converter is quite likely to have its operation affected by temperature and other factors. On the other hand, the constant capacity pump, which is a mechanical device, involves limited thermal expansion characteristics and is accordingly rather impervious to temperature variations. Therefore, by comparison with the changes of resistivity and the like which may occur in the pressure converter, the pump is rather stable in operation and suffers little or no wear and deterioration during use. Accordingly, the effects of temperature variation and of wear in the constant capacity pump are quite small as compared with the pressure converter and it has been found that the constant capacity pump may be advantageously utilized as a reference source for calibrating the pressure converter.

More specifically, it has been established that if the external flow rate through the bridge circuit is cut off or brought to zero flow, pressure difference between diagonally opposed points of the bridge circuit across which the constant capacity pump is connected will always be such as to represent half the rate of fluid flow circulation through the pump.

The present invention is derived from a realization of the aforementioned characteristics of such flow meter systems and is aimed at providing an improved fluid flow measuring system in which the effects of temperature and other factors causing deterioration and wear may be compensated by calibrating or correcting the pressure converter to produce an accurate indication of the flow rate to be measured by the system.

SUMMARY OF THE INVENTION

Briefly, the present invention may be described as a fluid flow rate measuring system comprising a bridge circuit including four interconnected flow orifices and a first and a second pair of diagonally opposed flow points, each of said points being located between a different pair of orifices, fluid flow passage means through which fluid flow to be measured is passed, means connecting said first pair of points within said fluid flow passage means as input and output, respectively, to said bridge circuit, a constant capacity pump connected in flow communication across the second pair of points, a pressure converter adapted to generate a signal representative of fluid flow rate in response to fluid pressure applied thereacross, means for calibrating the pressure converter, first valve means for opening and shutting fluid flow to and from said first pair of points, respectively, and means for connecting the pressure converter across the second pair of points. With the pressure converter connected across the second pair of points and with the external fluid flow entering and leaving the bridge circuit shut off, the pressure converter may be calibrated by adjusting the output signal thereof to a fluid flow rate reading which is equivalent to one-half the flow rate through the constant capacity pump.

In a first embodiment of the present invention, the means for connecting the pressure converter across the second pair of points may comprise second and third valve means which are connected and operated to selectively connect the pressure converter either across the first pair of points or across the second pair of points. In this embodiment, the pressure converter, during calibration, is connected across the second pair of points and when external fluid flow is to be measured, the first valve means are opened to establish fluid flow through the passage means to and from said first pair of points and the connection of the pressure converter may then be switched to connect the pressure converter across the first pair of points.

Alternatively, in a second embodiment of the invention, the pressure converter may be connected constantly across the second pair of points both during calibration and during measurement of the rate of external fluid flow.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
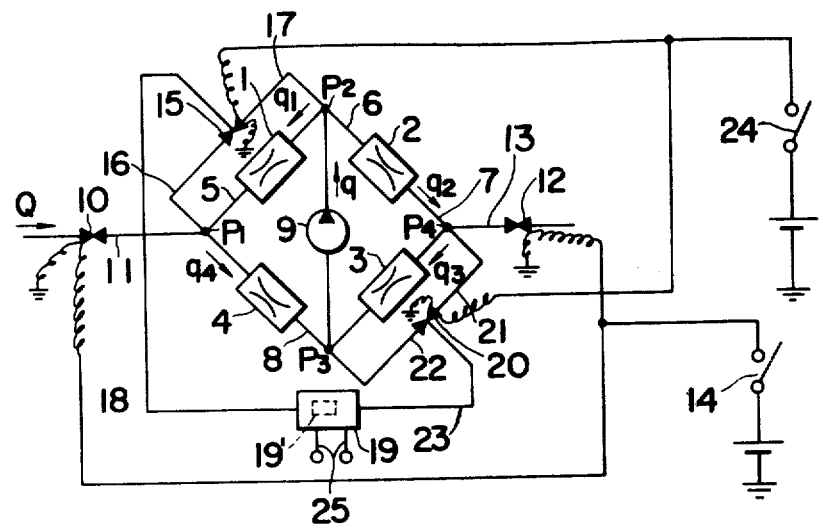
FIG. 1 is a diagram depicting a fluid flow rate measuring system in accordance with one embodiment of the present invention.

Referring now to the drawing wherein like reference numerals are utilized to refer to similar parts throughout both figures thereof, there is shown in FIG. 1 a flow rate measuring system comprising four orifices 1, 2, 3, and 4 each having the same coefficient of flow with the orifices interconnected as a bridge circuit through flow passages 5, 6, 7 and 8. A constant capacity pump 9 is connected between the passages 6 and 8 of the bridge circuit. The passage 5 of the bridge circuit is connected to a passage 11 provided with an on-off magnetic valve 10, with the other end of the passage 11 being connected as an input to the bridge circuit to introduce flow from a passage means whose flow rate is to be measured. The passage 7 is connected to a passage 13 provided with an on-off magnetic valve 12, with the other end of the passage 13 being arranged as an output from the bridge circuit discharging fluid therefrom to the other side of the fluid flow passage means within which the bridge circuit is to be connected.

The magnetic valves 10 and 12 are connected to switch means 14 by means of which both the valves 10 and 12 may be simultaneously closed to shut fluid flow through the passages 11 and 13 when calibration of a system is to be effected. After calibration, the switch means 14 is operated to once again open the valves 10 and 12 in order to again enable measurement of the flow rate through the external passage means.

Passages 5 and 6 of the bridge circuit are connected to the inlets of a two-position three-way magnetic valve 15 through passages 16 and 17, respectively, with the outlet of the three-way magnetic valve 15 being connected to a pressure converter 19 through a passage 18. Similarly, passages 7 and 8 are connected to the inlets of another two-position three-way magnetic valve 20 through passages 21 and 22, respectively, with the outlet of the valve 20 being connected to the pressure converter 19 through a passage 23. The switchover operating sections of both the three-way magnetic valves 15 and 20 are connected to a switch 24 whereby both magnetic valves 15 and 20 may be switched either into communication with passages 5, 7 of the bridge circuit and pressure converter 19 or into communication with passages 6, 8 and pressure converter 19.

The pressure converter 19 is adapted to convert the pressure difference applied between the two communicated passages connected thereto into an electrical signal. A calibrating or correcting means 19' for calibrating the pressure converter 19 and correcting error in the measured values thereof is provided with the pressure converter 19 having a pair of output terminals 25 across which an output signal representative of fluid flow rate is generated. The terminals 25 may be connected to an indicating device which may convert the output signal from the pressure converter 19 into a fluid flow rate signal.

In the arrangement described above, pressure differences between respective passages of the bridge circuit and flow rates occurring through the system may be utilized to calculate relationships existing in the system by means of which the calibrating means 19' of the pressure converter 19 may be adjusted so that the system will provide an accurate indication of the value of the flow rates to be measured taking into consideration exposure of the system to the influences of temperature effects and other factors which may cause deterioration or wear.

Let it here be assumed that pressures in the passages 5, 6, 7 and 8 of the bridge circuit comprise values P1, P2, P3 and P4, respectively, that the flow rate of the fluid flow to be measured by the system is Q, and that discharge of the constant capacity pump 9 is q. Let it also be assumed that the flow volume is not large, that is $q \geq Q$, that the direction of flow of the fluid in the respective passages of the bridge circuit is as indicated by arrows in FIG. 1, and that the flow rates of fluid flowing into the orifices 1, 2, 3 and 4 are $q1, q2, q3$ and $q4$, respectively. Then, the following equations are obtained from the flow balancing formulas:

$$q1 + Q = q4 \quad (1)$$
$$q1 + q2 = q \quad (2)$$
$$Q + q3 = q2 \quad (3)$$
$$q3 + q4 = q \quad (4)$$

Also, the relationship between flow rate and pressure drop at each orifice is expressed by the following equation:

$$q = KCA \sqrt{(P - P')/W}$$

where K is a constant, C is the coefficient of the orifice, A is the fluid passing area of the orifice, W is fluid density, and $P - P'$ is pressure difference between two points. Since KCA is a constant, it may be expressed as: $KCA = \sqrt{m}$.

Therefore,
in orifice 1,
$$q1 = \sqrt{m(P2 - P1)/W} \quad (5),$$
in orifice 2,
$$q2 = \sqrt{m(P2 - P4)/W} \quad (6),$$
in orifice 3,
$$q3 = \sqrt{m(P4 - P3)/W} \quad (7), \text{ and}$$

in orifice 4,
$$q4 = \sqrt{m(P1 - P3)/W} \quad (8)$$

From equations (5) and (6), $$(q1^2 - q2^2) = (q1 + q2)(q1 - q2) = (m/W)(P4 - P1) \quad (9),$$

from equations (7) and (8), $$(q3^2 - q4^2) = (q3 + q4)(q3 - q4) = (m/W)(P4 - P1) \quad (10),$$

and from equations (9) and (10),
$q = q1 + q2 = q3 + q4$, hence
$$q1 - q2 = q3 - q4 \quad (11).$$
Further,
since $q4 = q1 + Q$, (1),
equation (2) gives:
$$q2 = q - q1 \quad (2'),$$
and equation (3) gives:
$$q3 \times q2 - Q = q - q1 - q \quad (3').$$

Therefore, introducing equations (1), (2') and (3') into equation (11), $$q1 = (q - Q)/2 \quad (12).$$

Also, introducing equation (12) into equations (1), (2') and (3'), the following equations are obtained:
$$q2 = (q + Q)/2 \quad (13),$$
$$q3 = (q - Q)/2 \quad (14), \text{ and}$$
$$q4 = (q + Q)/2 \quad (15).$$

Therefore,
in orifice 1,
$$(q - Q)/2 = \sqrt{m\ (P2 - P1)/W} \quad (16),$$
in orifice 2,
$$(q + Q)/2 = \sqrt{m\ (P2 - P4)/W} \quad (17),$$
in orifice 3,
$$(q - Q)/2 = \sqrt{m\ (P4 - P3)/W} \quad (18), \text{ and}$$
in orifice 4,
$$(q + Q)/2 = \sqrt{m\ (P1 - P3)/W} \quad (19).$$

By determining the difference between both members of each of the equations (18) and (19) by squaring both members, the following equation is obtained:

$$q^Q = m\ (P1 - P4)/W$$

Hence, $$QW = (m/q)\ (P1 - P4)$$

Here, QW is the mass of the fluid to be measured, and $m/q$ is a constant as $m$ is a constant and $q$ is also constant, so that pressure difference between passages 5 and 7 is proportional to the mass of the flow rate Q. Therefore, a setting may be made by virtue of this fact such that the pressure converter 19 will generate an electric signal representative of the mass flow rate.

By adding both squared members of equations (17) and (18), $$\frac{q^2 + Q^2}{2} = \frac{p2 - p3}{W}$$

Here, if Q is 0, that is, when both magnetic valves 10 and 12 are closed to inhibit any flow of fluid into the bridge circuit, $$\frac{1}{2}qW = \frac{m}{q}(p2 - p3) \quad (20).$$

Therefore, if Q is 0, pressure difference between the passages 6 and 8 of the bridge circuit remains proportional to ½ of the constant circulation mass of the constant capacity pump 9, even if the flow measuring system is placed under the influence of temperature and/or other factors. Since q is constant, ½ qW can be easily obtained by measuring fluid density. Thus, if the correcting means 19' is adjusted such that the pressure converter 19 will express ½ of the circulation rate of the constant capacity pump 9 when Q is 0, no error of measurement will occur even if the flow measuring system is influenced by temperature and other factors.

In the operation of the present flow measuring system as actually used for measuring flow rate in an externally connected flow passage means, the passages 11 and 13 are connected within a fluid passage within which fluid flow rates are to be measured so that the fluid whose flow rate is to be measured will flow in through the magnet valve 10 and will flow out through the magnet valve 12. The constant capacity pump 9 is driven to fill the respective passages of the bridge circuit with the fluid from the passage means. At this time, the three-way magnet valves 15 and 20 may be switched to any position. Thereafter, the magnet valves 10 and 12 are closed by operating the switch 14, and the constant capacity pump 9 continues to be operated. Since pressure difference between the passages 6 and 8 is equal to ½ of flow rate through the constant capacity pump 9 as explained above, the three-way magnet valves 15 and 20 are switched over by the operation of the switch 24 to communicate said passages 6 and 8 with the pressure converter 19, so that if the calibrating means 19' is adjusted such that the pressure converter 19 will indicate ½ of the flow rate in the pump 9, a correct indication of flow rate is given by the flow measuring system regardless of whether said system is under influence of temperature and/or other factors. Then, the on-off magnet valves 10 and 12 are opened by the switch 14 to allow fluid in the passage means to flow into the bridge circuit. Further, the three-way magnet valves 15 and 20 are switched over by the operation of the switch 24 to communicate the passages 5 and 7 with the pressure converter 19, whereupon said pressure converter 19 emits an electrical signal representative of the flow rate to be measured.

There will now be described the case where fluid flow rate Q in the external passage means and the constant capacity pump discharge q has the relationship $q \leq Q$, while referring to FIG. 2. In this case, since the flow rate of the fluid to be measured is greater than the discharge of the constant capacity pump 9, the system can be used only where the flow rate is high. If the flow rate is small, the system is ineffective.

In this embodiment, passages 5, 7 and passages 6, 8 are not communicated with the pressure converter 19 through the three-way magnet valves 15 and 20 as in the preceding embodiment. Instead, passages 6 and 8 of the bridge circuit are maintained directly in communication with the pressure converter 19 through passages 26 and 27, respectively.

The flow rate in the external passage means which is to be measured may be expressed in terms of pressure difference between the passages 6 and 8 of the bridge circuit, and the calibrating means 19' may be adjusted such that an accurate flow rate will be represented by the pressure converter 19 even when the flow measuring system is undergoing influences of temperature and/or other factors.

Figure 2:
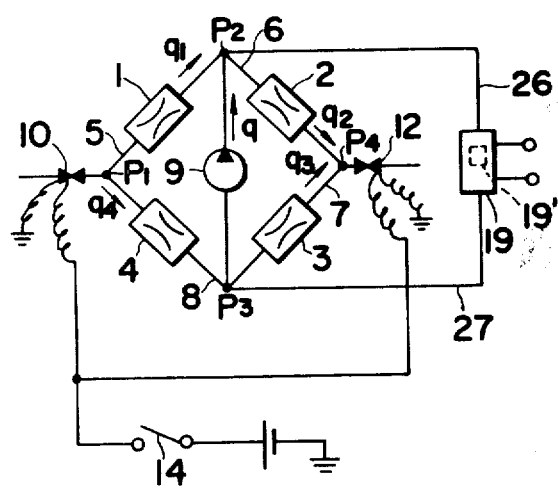
FIG. 2 is a diagram depicting such a system in accordance with another embodiment of the invention.

Here, the same calculation formulae as in the preceding embodiment may be utilized but as noted from FIG. 2, flows q1 and q3 are contrary to those in FIG. 1.

From calculations made in the same manner as in the previous embodiment, the following equations are obtained:
In the orifice 1,
$$(Q - q)/2 = \sqrt{m\ (P1 - P2)/W} \quad (21),$$
in the orifice 2,
$$(Q + q)/2 = \sqrt{m\ (P2 - P4)/W} \quad (22),$$
in the orifice 3,
$$(Q - q)/2 = \sqrt{m\ (P3 - P4)/W} \quad (23), \text{ and}$$
in the orifice 4,
$$(Q + q)/2 = \sqrt{m\ (P1 - P3)/W} \quad (24)$$

By obtaining the difference between both members of each of the equations (22) and (23) by squaring both members, the following equation is obtained:

$$qQ = m\ (P2 - P3)/W$$

Hence, $$QW = (m/q)\ (P2 - P3)$$

This dictates that pressure difference between the passages 6 and 8 of the bridge circuit is proportional to the flow rate Q. Thus, a setting is made by virtue of this fact such that the pressure converter 19 will emit an electrical signal expressing the fluid flow rate.

On the other hand, when Q is 0, from the above-cited equation (20), $$\frac{1}{2}qW = \frac{m}{q}(p2 + p3)$$

is established as in the case where $q \geqq Q$, so that the correcting means 19' of the pressure converter 19 can be adjusted in the same manner.

The same operations as in the preceding embodiment may be followed for measuring the flow rate through the external passage means by using this flow measuring system, but in this case, passages 6, 8 and pressure converter 19 are communicated with each other both when calibrating the pressure converter 19 and when obtaining an electric signal representative of the measured flow rate with the pressure converter 19, so that there is required no switchover operation of the three-way magnet valve as practiced in the preceding embodiment.

Magnet valves 10 and 12 may be replaced by universal fluid couplings arranged such that both passages will be closed when the couplings are disengaged. Also, opening and closing of the magnet valves and change-over of fluid passages may be accomplished manually by controlling the switches 14 and 24. If desired, such switches may be controlled automatically to effect automatic opening and closing of magnetic valves and automatic changeover of fluid passages.

Further, although there are shown hereinabove embodiments wherein magnet valves (10, 12, 15, 20) are utilized to open and close the fluid passages, these valves need not necessarily be magnet valves; they may be valves which are operated manually or by other methods.

As indicated above, according to the present invention, the pressure converter, even when exposed to influences of temperature and/or other factors, may be calibrated so as to provide an accurate indication of flow rate, and the fluid to be measured may be passed through the flow measuring system, so that any flow rate is correctly measured even if the system is undergoing the influences of temperature and/or other factors. The embodiment of FIG. 2 is a slight modification of the embodiment of FIG. 1 where the three-way magnet valves are adapted such that the passages 6 and 8 alone are communicated with the pressure converter 19. The flow measuring system of FIG. 1 is capable of measuring flow no matter what relationship exists between Q and $q$. Further, the flow measuring system according to the present invention is simple and easy to operate as compared with conventional flow measuring systems and is also capable of measuring any sort of fluid.

While specific embodiments of the invention have been shown and described in detail to illustrate the application of the inventive principles, it will be understood that the invention may be embodied otherwise without departing from such principles.

What is claimed is:

1. A method for calibrating a fluid flow rate measuring system which includes a bridge circuit having four interconnected flow orifices and four flow points each located between a different pair of said four orifices, said four flow points consisting of a first and a second pair of diagonally opposed flow points, fluid flow passage means through which fluid flow whose rate is to be measured is passed, means connecting said first pair of flow points within said passage means as inlet and outlet, respectively, to said bridge circuit, constant capacity pump means connected in flow communication across said second pair of flow points, a pressure converter adapted to generate a signal representative of fluid flow rates in response to fluid pressure applied thereacross, means for calibrating said pressure converter, first valve means for opening and closing fluid flow to and from said first pair of flow points, respectively, and means for connecting said pressure converter across said second pair of points, said method comprising the steps of operating said calibration means to calibrate said pressure converter while maintaining said pressure converter connected across said second pair of flow points and simultaneously closing fluid flow to and from said first pair of flow points with said constant capacity pump means in operation.

2. A method according to claim 1 wherein after said calibration said first valve means are opened to establish flow through said passage means to and from said first pair of points, respectively, whereby measurement of the fluid flow rate through said passage means may be effected.

3. A method according to claim 1 wherein said means for connecting said pressure converter across said second pair of points comprises means for selectively connecting said pressure converter either across said first pair of points or across said second pair of points, said method further comprising the steps of opening said first valve means after said calibration to establish flow through said passage means to and from said first pair of points, respectively, whereby measurement of the fluid flow rate through said passage means may be effected, and thereafter connecting said pressure converter from across said second pair of points to across said first pair of points.

4. A method according to claim 1 wherein during said calibration procedure with said pressure converter connected across said second pair of points, said pressure converter is calibrated to generate an output signal representing a flow rate which is one-half the flow rate through said constant capacity pump means.

* * * * *